(12) United States Patent
Stengl et al.

(10) Patent No.: US 12,224,088 B2
(45) Date of Patent: Feb. 11, 2025

(54) COAX CABLE FOR INDUCTIVE CHARGING

(71) Applicant: LEONI KABEL GMBH, Roth (DE)

(72) Inventors: Sebastian Stengl, Heideck (DE); Guenter Koenig, Schwabach (DE)

(73) Assignee: LEONI KABEL GMBH, Roth (DE)

( * ) Notice: Subject to any disclaimer, the term of this patent is extended or adjusted under 35 U.S.C. 154(b) by 536 days.

(21) Appl. No.: 17/608,559

(22) PCT Filed: Apr. 30, 2020

(86) PCT No.: PCT/EP2020/062087
§ 371 (c)(1),
(2) Date: Nov. 3, 2021

(87) PCT Pub. No.: WO2020/229196
PCT Pub. Date: Nov. 19, 2020

(65) Prior Publication Data
US 2022/0230782 A1 Jul. 21, 2022

(30) Foreign Application Priority Data
May 15, 2019 (DE) .......................... 102019112742.4

(51) Int. Cl.
*H01B 9/04* (2006.01)
*B60L 53/12* (2019.01)
*H01B 1/02* (2006.01)
*H01B 7/32* (2006.01)

(52) U.S. Cl.
CPC ............... *H01B 9/04* (2013.01); *B60L 53/12* (2019.02); *H01B 1/02* (2013.01); *H01B 7/324* (2013.01)

(58) Field of Classification Search
CPC ... H01B 1/02; H01B 1/04; H01B 1/06; H01B 1/08; H01B 7/02; H01B 7/04; H01B 7/18; H01B 7/34; H01B 7/324; H01B 7/42; H01B 7/423; H01B 7/425; H01B 9/006;
(Continued)

(56) References Cited

U.S. PATENT DOCUMENTS 281,223 A * 7/1883 Rogers ..................... H01B 7/00
174/110 R
2,342,736 A * 2/1944 Herzog .............. H01B 11/1813
174/131 R
(Continued)

FOREIGN PATENT DOCUMENTS

CN 2456269 Y 10/2001
CN 201489907 U 5/2010
(Continued)

OTHER PUBLICATIONS

Chinese Examination Report Dated Dec. 25, 2023—Chinese Appln. 202080035872.5.

*Primary Examiner* — William H. Mayo, III
(74) *Attorney, Agent, or Firm* — Tarolli, Sundheim, Covell & Tummino LLP

(57) ABSTRACT

A coaxial cable includes a non-conductive core and a first flexible copper conductor which surrounds the non-conductive core and is used as an inner conductor of the coaxial cable. Insulation is provided around the first flexible copper conductor. A second flexible copper conductor which surrounds the insulation and serves as an outer conductor of the coaxial cable.

8 Claims, 1 Drawing Sheet

(58) Field of Classification Search
CPC .. H01B 9/02; H01B 9/04; H01B 11/18; B06L 53/16; B06L 53/18
USPC ...... 174/28, 102 R, 103, 104, 105 R, 106 R, 174/107, 108, 110 R–110 E, 113 R, 174/113 AS, 117 R, 117 AS, 174/120 R–131 R; 333/12, 243
See application file for complete search history.

(56) References Cited

U.S. PATENT DOCUMENTS

| | | | | |
|---|---|---|---|---|
| 2,669,695 | A * | 2/1954 | Bird | H04B 15/025 |
| | | | | 174/105 R |
| 2,759,990 | A * | 8/1956 | Bean | H01B 7/043 |
| | | | | 87/9 |
| 3,163,836 | A * | 12/1964 | Sugi | H01B 7/30 |
| | | | | 178/45 |
| 3,484,679 | A * | 12/1969 | Hodgson | H02J 3/1835 |
| | | | | 174/105 R |
| 4,376,920 | A * | 3/1983 | Smith | H01P 3/06 |
| | | | | 174/105 R |
| 5,298,682 | A * | 3/1994 | Salz | H01B 11/1813 |
| | | | | 174/105 R |
| 5,304,739 | A | 4/1994 | Klug et al. | |
| 5,493,070 | A * | 2/1996 | Habu | H01B 11/206 |
| | | | | 174/105 R |
| 5,500,488 | A | 3/1996 | Buckel | |
| 5,557,698 | A | 9/1996 | Gareis et al. | |
| 5,777,273 | A | 7/1998 | Woody et al. | |
| 6,296,066 | B1 * | 10/2001 | Terry | G01V 3/30 |
| | | | | 175/320 |
| 6,326,551 | B1 | 12/2001 | Adams | |
| 6,577,236 | B2 * | 6/2003 | Harman | H01Q 13/203 |
| | | | | 340/552 |
| 6,583,360 | B1 * | 6/2003 | Yudashkin | H01B 11/1821 |
| | | | | 174/105 R |
| 2012/0181059 | A1 | 7/2012 | Radermacher et al. | |

FOREIGN PATENT DOCUMENTS

| | | |
|---|---|---|
| CN | 102110510 A | 6/2011 |
| CN | 102446574 A | 5/2012 |
| CN | 203941997 U | 11/2014 |
| CN | 205050589 U | 2/2016 |
| CN | 105474329 A2 | 4/2016 |
| DE | 4432878 A1 | 3/1996 |
| DE | 10108843 A1 | 1/2002 |
| DE | 102016210152 A1 | 12/2017 |
| DE | 102016224103 A1 | 6/2018 |
| GB | 583582 | 12/1946 |
| WO | 2014019635 | 2/2014 |
| WO | 2018044782 A1 | 3/2018 |

\* cited by examiner

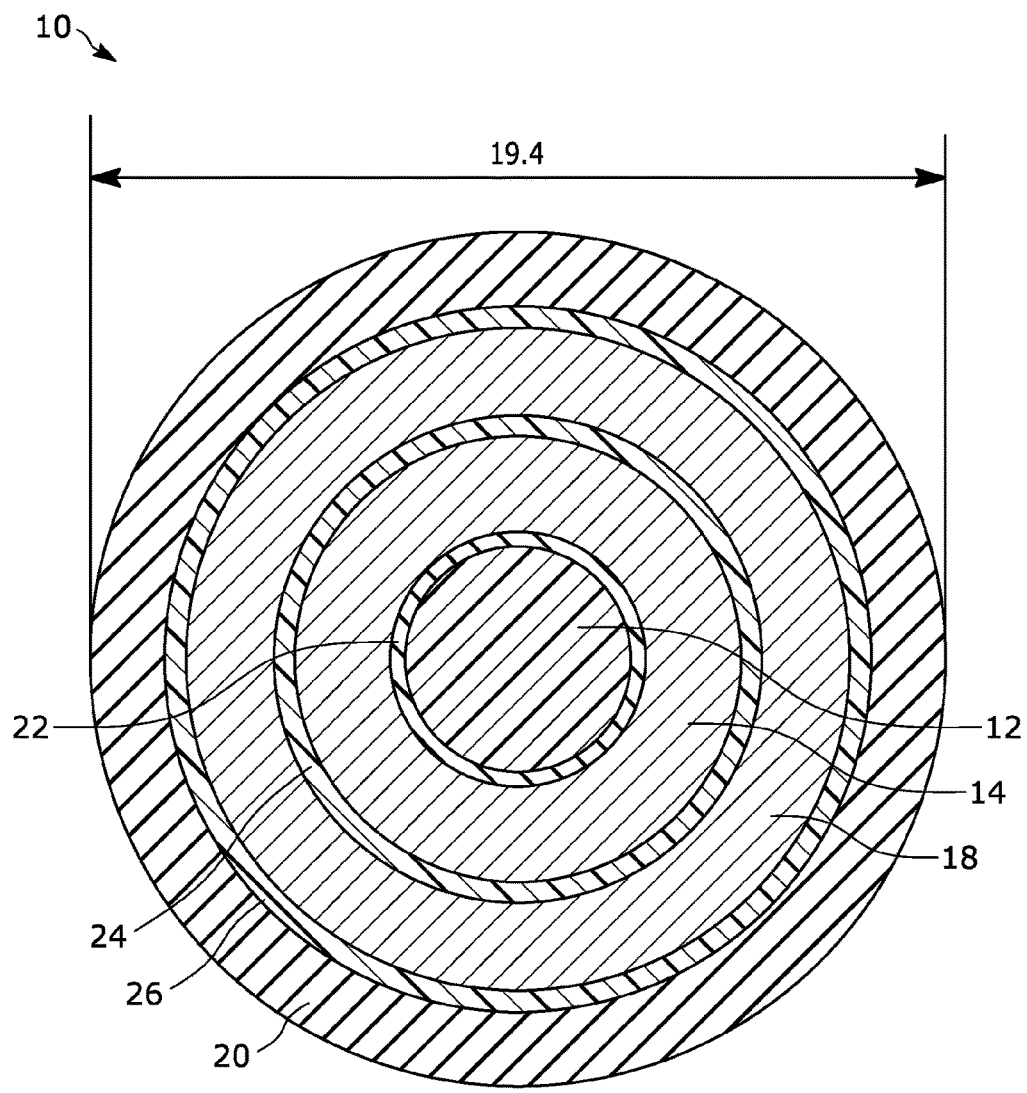

COAX CABLE FOR INDUCTIVE CHARGING

RELATED APPLICATIONS

This application filed under 35 U.S.C § 371 is a national phase application of International Application Number PCT/EP2020/062087, filed Apr. 30, 2020, which claims the benefit of German Application No. 10 2019 112 742.4 filed May 15, 2019, the subject matter of which are incorporated herein by reference in their entirety.

TECHNICAL FIELD

The invention relates to a coaxial cable and in particular to a coaxial cable for charging electric vehicles.

BACKGROUND

Leads and cables are used for various applications. Inter alia, such applications can be fields of use in which high currents and/or high frequencies (e.g. high-frequency range) are used. For example, cables are used for the charging of vehicles, such as, for example, for the inductive charging of vehicles. One possible way of inductively charging vehicles provides that a charging station is connected to a charging arrangement via a cable/charging cable. The charging arrangement can be arranged on the ground and comprises inductors. The charging station is then not connected directly to the vehicle for the charging process but to the charging arrangement via a cable. The vehicle can then be inductively charged in the known manner by being placed/moved onto the charging arrangement.

High currents in the region of several amperes and above require an appropriately large conductor cross-section. During the transmission of alternating signals, such as, for example, alternating current, the current in the conductor cross-section is displaced to the conductor surface by internal magnetic fields as the frequency increases. This effect is known as the skin effect. For example, at a frequency of 10 MHz, the current density 20 µm beneath the surface is only 1/e (37%) of the current density at the outermost surface. This means that only a small portion of the total cross-section of the cable carries the main part of the current.

It is known to use cables having litz wires in many areas of electrical engineering. In electrical engineering, a litz wire is an electrical conductor consisting of thin individual wires. litz wires are often easy to bend. In electric cables, copper is often used as the conductor therefor. The individual wires of the litz wire (e.g. several hundred individual wires) are in most cases enclosed by a common insulating sleeve. A conductor formed in this way is usually referred to as a litz-wire line or litz-wire conductor. If a plurality of such lines are combined to form a cable, they are often referred to as leads of the cable.

In order to reduce the skin effect and/or the so-called proximity effect, which is due to a displacement of current between two closely adjacent conductors, an insulation is often provided in high-frequency litz wires (normally abbreviated to HF litz wires) between the individual wires. Enamel is often used for the insulation, that is to say the individual wires of a litz wire are insulated from one another by a layer of enamel.

This insulation is accordingly also provided when the litz wires carry the same potential. By reducing the skin effect and/or the proximity effect, a larger portion of the total cross-section of the cable takes part in transporting the current. However, this procedure is complex in terms of production and processing of the cable. In addition, a cable of a complex construction is formed.

That is to say, for high-frequency applications there are conventionally used enameled individual wires which are formed into litz-wire cables. Owing to the high frequency, the electrons are pushed to the outside of the conductor during the current transmission. If conductors that exceed a particular diameter are used, no or only a negligibly small current flows in the core of the conductor at higher frequencies. The frequency determines how far the electrons are pushed to the outside. This so-called penetration depth is critical for the wire or conductor diameter to be used. Insulating thin individual wires from one another increases the power transmission at relatively small cross-sections. Such thin insulated individual wires are often referred to as enameled wire conductors.

The litz-wire cables known from the prior art are complex in construction, expensive to produce and often have a relatively high power dissipation.

There is therefore a need to provide a cable which is of simple construction and has good electrical properties, in particular good high-frequency properties and/or as low a power dissipation as possible.

SUMMARY OF THE INVENTION

According to a first aspect of the invention there is provided a coaxial cable. The coaxial cable comprises a non-conductive core. The coaxial cable comprises a first flexible copper conductor which surrounds the non-conductive core and serves as the inner conductor of the coaxial cable. The coaxial cable comprises an insulation around the first flexible copper conductor. The coaxial cable comprises a second flexible copper conductor which surrounds the insulation and serves as the outer conductor of the coaxial cable.

The coaxial cable can also be referred to as a coaxial conductor or coaxial lead. The configuration as a coaxial cable leads to a relatively homogeneous field line distribution. This leads inter alia to a reduced power dissipation during power transmission using the coaxial cable compared to conventional litz-wire conductors. In the exemplary case of the use of the coaxial conductor in or as a cable for inductive charging, the homogeneous field line distribution leads to a reduced power dissipation on power transmission using the coaxial cable compared to conventional litz-wire conductors. Owing to the very low specific resistance of copper of about 0.017 ohm*mm$^2$/m, the electrical conductivity of the coaxial cable is very high.

As a result of the skin effect, the charge carriers of an electric current in any case move to the greatest possible extent at high frequencies in an outer region of a conductor, and thus in a region which corresponds at least to the greatest possible extent to the flexible copper conductors of the coaxial cable. The non-conductive core consists of a non-conductive material or comprises a non-conductive material. The non-conductive core (which can also be referred to as the cable core) itself has at least almost no electrical conductivity. Therefore, the core plays at least almost no part in the conduction of an electric current. Moreover, the core is mechanically relatively stable and loadable and is at least mechanically more stable than the flexible copper conductor surrounding the core. The fact that, in the coaxial cable proposed here, the core does not take part in the conduction for the simple reason that it consists of a non-conductive material is therefore of at least almost no consequence for the current transmission/power transmission.

The non-conductive core, the first flexible copper conductor and the second flexible copper conductor are in particular arranged coaxially about a common center point.

Today's coaxial cables for high currents and voltages are in the form of copper tubes/small copper tubes or comprise copper tubes/small copper tubes as conductors. Copper tubes/small copper tubes are not flexible/not (easily) bendable. This results in an inflexible cable. In various types of application, such as, for example, inductive charging, flexible cables are desirable, however, since the cables must be laid under the road, for example, where there is a lack of space. The flexible copper conductors of the coaxial conductor according to the first aspect result in a more flexible coaxial conductor than the known coaxial conductors. The term flexible conductor will be understood by the person skilled in the art. In the further sense, flexible can be understood herein as meaning not rigid, or not stiff, or bendable. In the narrower sense, the flexible copper conductors can be understood such that they are more flexible/more bendable/less rigid/less stiff than the known copper tubes/small copper tubes.

The insulation between the first and the second flexible copper conductor can have, for example, a thickness (seen in the radial direction of the coaxial cable) of from 0.1 to 4 mm, for example a thickness of at least or exactly 2 mm. The insulation can alternatively be referred to as a dielectric. The dielectric can be in the form of a solid dielectric. The dielectric is often foamed in the manufacturing process but may also be wound. The dielectric is arranged between the inner conductor and the outer conductor. The first and second copper conductors are spaced apart from one another by the dielectric.

For example, the first flexible copper conductor surrounding the non-conductive core is applied directly to the non-conductive core and is in contact therewith.

Alternatively, the first flexible copper conductor surrounding the non-conductive core is applied not directly (but indirectly) to the non-conductive core and is in contact therewith not directly but only indirectly. For example, an insulation layer can be arranged between the non-conductive core and the first flexible copper conductor.

The coaxial cable further comprises a shielding arranged around the second flexible copper conductor. The shielding can at least reduce, if not even avoid, interference by the electric field of the coaxial cable with other electronic components. The shielding can also be referred to as a shield or electric shield. By adjusting the distance between the outer conductor and the shield, the induction of a power dissipation in the shield by the electric field of the coaxial conductor can be adjusted.

There are conceivable as the shielding simple braids, films or a combination of braids and films. The shielding can further be in the form of a flat braid.

The outer conductor can have shielding properties and thus be in the form of a shielding. In other words, the outer conductor and the shielding can be the same element, which on the one hand provides the function of an outer conductor and on the other hand provides the function of a shielding. That is to say, the outer conductor can be the shielding. Alternatively, the outer conductor and the shielding can be different and separate components. For example, the shielding can be arranged around the outer conductor. In this case, the outer conductor can be arranged between the shielding and the dielectric.

The non-conductive core can, for example, comprise plastics material or be formed of plastics material. Alternatively, the non-conductive core can comprise air or be formed of air. A combination of plastics material and air is conceivable for the non-conductive core.

The non-conductive core can comprise a heat-absorbing insulating material. For example, the heat-absorbing insulating material can have been/be introduced into the non-conductive core. The heat-absorbing insulating material can be a plastics material. For example, the non-conductive core is formed partially or completely of the heat-absorbing insulating material. The non-conductive core can consist, for example, completely of the heat-absorbing insulating material.

If the non-conductive core comprises a heat-absorbing/heat-insulating material or if the non-conductive core even consists of a heat-absorbing material (and is accordingly in the form of a non-conductive, heat-absorbing core), the very high heat development that occurs in high-frequency conductors can be regulated.

Insulating material used in or for the non-conductive core can comprise a crosslinked polyethylene (PE-X) or consist of PE-X. In this case, the non-conductive core can have a relative permittivity (often also referred to as relative dielectric conductivity) of about 2.25, a comparative tracking index (CTI) according to IEC 60112 of KA:3b; KB>600; KC>600 and/or a thermal conductivity in W/(m*K) in a range from 0.32 to 0.40.

Fillers used in or for the non-conductive core can comprise, for example, polypropylene (PP) or consist of PP. In this case, the non-conductive core can have a relative permittivity (often also referred to as relative dielectric conductivity) of about 2.27, a dissipation factor of $1\times10^3$, a comparative tracking index according to IEC 60112 of KA:3b; KB>600; KC>600 and/or a thermal conductivity in W/(m*K) in a range from 0.17 to 0.22.

The coaxial cable has as low a capacitance as possible between the individual layers, for example. There is a low capacitance, for example, in particular between the two flexible copper conductors. This can be achieved, for example, with foams between the various copper conductors or the various layers of the coaxial cable. The coaxial cable consequently has low values for the capacitance.

The first flexible copper conductor can be of layered form. The first flexible copper conductor can be annular in cross-section. In addition or alternatively, the second flexible copper conductor can be of layered form. The second flexible copper conductor can be annular in cross-section.

The first flexible copper conductor can comprise a plurality of individual wires of copper (individual copper wires) which are not insulated from one another or can be formed of a plurality of individual wires of copper (individual copper wires) which are not insulated from one another. In addition or alternatively, the second flexible copper conductor can comprise a plurality of individual wires of copper (individual copper wires) which are not insulated from one another or can be formed of a plurality of individual wires of copper (individual copper wires) which are not insulated from one another. The individual wires can in each case have a thickness in a range from 0.05 mm to 0.5 mm, for example a thickness of at least or exactly 0.1 mm.

The plurality of individual copper wires which are not insulated from one another of the first and/or second copper conductor increase the flexibility of the copper conductors and thus of the coaxial cable overall compared to enameled wires or copper tubes/small copper tubes used in the prior art. The individual copper wires can be round or flat. A combination of round and flat individual copper wires is also conceivable. For example, all the individual copper wires can be in the form of flat conductors or in the form of round conductors.

The first flexible copper conductor can comprise one or more copper braids or be formed of one or more copper braids. In addition or alternatively, the second flexible copper conductor can comprise one or more copper braids or be formed of one or more copper braids. For example, the one or more copper braids of the first flexible copper conductor can be formed of a plurality of individual copper wires which are not insulated from one another. In addition or alternatively, the one or more copper braids of the second flexible copper conductor can be formed of a plurality of individual copper wires which are not insulated from one another.

The first flexible copper conductor can comprise one or more wire bundles or be formed of one or more wire bundles. In addition or alternatively, the second flexible copper conductor can comprise one or more wire bundles or be formed of one or more wire bundles. For example, the one or more wire bundles of the first flexible copper conductor can be formed of a plurality of individual copper wires which are not insulated from one another. In addition or alternatively, the one or more wire bundles of the second flexible copper conductor can be formed of a plurality of individual copper wires which are not insulated from one another.

Regardless of the precise configuration of the copper conductors, both the first copper conductor and the second copper conductor are flexible (bendable). The flexibility of the first and second copper conductors can be achieved, for example, by stranding or braiding a plurality of individual copper wires. Depending on the lay length of the stranding or braiding, a different degree of flexibility can be achieved. The shorter the lay lengths used, the more flexible the copper conductors and thus the coaxial cable (angle of twist/lay e.g. between 40°-75° degrees).

The insulation and optionally further insulations of the coaxial cable can comprise or consist of a thermoplastic insulating plastics material. Alternatively, the insulation and optionally further insulations of the coaxial cable can comprise a crosslinked polyethylene (PE-X) or be formed of PE-X. If the insulation is formed of PE-X, it has a relative permittivity (often also referred to as relative dielectric conductivity) of about 2.25. If the insulation is formed of PE-X, it has the following comparative tracking index (CTI) according to IEC 60112: KA:3b; KB>600; KC>600. If the insulation is formed of PE-X, it has a thermal conductivity in W/(m*K) in a range from 0.32 to 0.40.

Fillers used in the coaxial conductor can comprise, for example, polypropylene (PP) or be formed of PP. If the fillers are formed of PP, they have a relative permittivity (often also referred to as relative dielectric conductivity) of about 2.27 and a dissipation factor of $1 \times 10^3$. The insulation used and the fillers used permit a use of up to 90° C. (and 20000h). If the fillers are formed of PP, they have the following comparative tracking index according to IEC 60112: KA:3b; KB>600; KC>600. If the fillers are formed of PP, they have a thermal conductivity in W/(m*K) in a range from 0.17 to 0.22.

The coaxial cable can further comprise at least one sensor. At least the at least one sensor can be in the form of a temperature sensor which is configured to detect the temperature of the coaxial cable.

The coaxial cable can further comprise at least one second sensor. The at least one second sensor can be configured to monitor a state of the cable and to communicate that state to a user via an evaluation unit.

The temperature sensor can be in the form of a sensor wire introduced into the coaxial cable, for example in the form of a sensor wire braided into the coaxial cable.

In one exemplary embodiment, the coaxial cable can comprise at least two sensors. At least one of the at least two sensors can be in the form of a temperature sensor. The temperature sensor is configured to detect the temperature of the coaxial cable.

The temperature sensor can be in the form of a sensor wire introduced into the coaxial cable. For example, the temperature sensor can have been/be interwoven or braided in the form of a sensor wire into the coaxial cable. By means of the temperature sensor, it is possible in a simple manner to determine and optionally monitor whether the coaxial cable is in an appropriate temperature range. For example, the coaxial cable can be monitored by means of the temperature sensor for overheating. The sensor wire introduced can be/have been flexibly braided into the cable so that the cable is not damaged thereby.

The temperature sensor and/or the at least one second sensor can be in the form of resistance-based sector sensors. The at least one second sensor can be a sensor for measuring at least one further parameter other than the temperature. For example, the coaxial cable can comprise or be in the form of at least one sensor cable (at least one line) for measuring the temperature and at least one further parameter.

The sector sensor can be in the form of a sensor line. The sensor line can be configured to detect an environment variable, for example the temperature, and comprise a line core and a number of resistor elements, spaced apart from one another in the longitudinal direction, having a respective resistance value. The resistance value varies in dependence on a value of the environment variable, for example of the temperature. The line core serves in the present case, for example, for mechanical stability of the sensor line, for example as strain relief. To this end, the line core comprises in particular a plastics material, for example aramid-based or polyethylene (PE). Alternatively, the line core is in the form of one or more electrical or optical transmission elements. The sensor line extends from a first end to a second end. A respective resistor element hereby defines a measurement section along the sensor line. For example, the resistor elements are arranged along the sensor line at a predefined distance from one another. In other words: The measurement sections define selected sectors along the sensor line in which the environment variables, for example the temperature,—in particular the change in the environment variable, for example the change in the temperature,—can be detected in a sector-dependent manner, so that, in dependence on a measurement section in which the change in the environment variable, in particular the temperature, is detected during operation, it is possible to conclude at which location/position along the sensor line the change in the environment variable has occurred.

The coaxial cable and in particular the at least two sensors can be connected to an evaluation unit. The evaluation unit can be, for example, an external evaluation unit.

The evaluation unit can be connected to the coaxial cable, for example, via a cloud or can be in the form of a cloud. The evaluation unit can be configured to evaluate data acquired from the coaxial cable. The evaluation unit can be configured, in dependence on the evaluated data, to warn of and optionally respond to a possible failure. The coaxial cable can form with the evaluation unit a common system according to a second aspect of the invention. In other words, a system according to a second aspect of the invention can comprise the coaxial cable and the evaluation unit.

By means of the coaxial cable, a bending radius (more specifically, an inner bending radius) in the fixedly laid state of, for example, 2×D or 4×D can be achieved. In the freely movable state, a bending radius of 2.5×D or 6×D can be achieved. "D" is the outside diameter of the coaxial cable, i.e. "2×D" denotes a bending radius of twice the outside diameter of the coaxial cable. The bending radius denotes, for example, the radius to which the coaxial cable can be bent without damage occurring.

BRIEF DESCRIPTION OF THE DRAWINGS

The present invention is to be explained further with reference to a FIGURE. This FIGURE shows, schematically:

FIG. 1 an exemplary embodiment of a coaxial cable.

DETAILED DESCRIPTION

Specific details will be set out hereinbelow, without being limited thereto, in order to provide a complete understanding of the present invention. It will be clear to a person skilled in the art, however, that the present invention can be used in other exemplary embodiments which may differ from the details set out hereinbelow. Furthermore, the figures serve only for the purposes of illustrating exemplary embodiments. They are not true to scale and are merely to reflect the general concept of the invention by way of example. For example, features that are contained in the figures are in no way to be considered a necessary component.

FIG. 1 shows an exemplary embodiment of a coaxial cable 10. The coaxial cable comprises a non-conductive core 12. The coaxial cable 10 further comprises a first flexible copper conductor 14 surrounding the non-conductive core 12. The first flexible copper conductor 14 serves as the inner conductor of the coaxial cable 10. The coaxial cable 10 further comprises an insulation 24 around the first flexible copper conductor 14. The coaxial cable 10 further comprises a second flexible copper conductor 18 surrounding the insulation 24. The second flexible copper conductor 18 serves as the outer conductor of the coaxial cable 10.

The coaxial cable 10 optionally further comprises a shielding 20 arranged around the second flexible copper conductor. The shielding 20 can also be referred to as a shield 20. The coaxial cable 10 optionally further comprises an insulation 22 around the non-conductive core 12. The coaxial cable 10 optionally further comprises an insulation 26 around the second flexible copper conductor 18.

In summary, FIG. 1 shows a schematic illustration of the coaxial cable 10 having the non-conductive core 12, the first flexible copper conductor 14 as the inner conductor, the second flexible copper conductor 18 as the outer conductor, the optional shielding 20, the optional insulation 22 between the non-conductive core 12 and the first flexible copper conductor 14, the insulation 24 between the first flexible copper conductor 14 and the second flexible copper conductor 18, and the optional insulation 26 between the second flexible copper conductor 18 and the shielding 20.

The first flexible copper conductor 14 can comprise or be formed of a plurality of individual wires, litz-wire conductors or braids, not shown in FIG. 1. The second flexible copper conductor 18 can comprise or be formed of a plurality of individual wires, litz-wire conductors or braids, not shown in FIG. 1.

Purely by way of example and without being limited thereto, the outside diameter of the first flexible copper conductor 14 (of the inner conductor) is about 5.7 mm, the inside diameter of the second flexible copper conductor 18 (of the outer conductor) is about 10.2 mm, the inside diameter of the shielding 20 is about 15.2 mm, and the outside diameter of the coaxial cable 10 is about 19.4 mm. These values are to be understood as being purely by way of example and serve only to illustrate a possible configuration of the coaxial cable 10. Other values are possible. Tolerances must further be taken into consideration when producing the coaxial cable 10 and the individual components thereof.

By means of the coaxial cable 10, efficient current transmission can be achieved. As described, the charge carriers (electrons) which serve to transmit current are pushed outwards at high frequencies to a greater or lesser extent depending on the frequency, which is referred to as the penetration depth. Efficient current transmission thus continues even if, with a corresponding penetration depth, the first flexible copper conductor 14 is arranged over a non-conductive material, which is referred to herein as the non-conductive core 12. The non-conductive core 12 can be, for example, a plastics core. Alternatively, the non-conductive core 12 can be air.

The first flexible copper conductor 14 and/or the second flexible copper conductor 18 can be annular or annular in cross-section.

In order to make it possible that the coaxial cable 10 is still flexible for installation during use, the first flexible copper conductor 14 and/or the second flexible copper conductor 18 can be composed of a flexible conductor layer. The flexible conductor layer can be one or more litz wires/litz-wire conductors. The litz wires/litz-wire conductors can have a relatively small diameter, for example, in order to permit the desired flexibility. The flexible conductor layer can alternatively be one or more copper braids. The copper braid or the copper braids can each consist of a plurality of copper conductors/individual copper wires braided together or can comprise a plurality of individual copper wires braided together. The plurality of individual copper wires braided together are in particular not insulated from one another/ with respect to one another, that is to say the individual copper wires are not individual wires insulated with enamel. That is to say, it is possible to configure the flexible copper conductors 14, 18 as a bundle or as a braid.

The inner conductor (the first flexible copper conductor 14) can be, for example, the forward conductor of the coaxial cable 10. The outer conductor (the second flexible copper conductor 18) can be, for example, the return conductor of the coaxial cable 10. Alternatively, it is conceivable that the inner conductor (the first flexible copper conductor 14) is, for example, the return conductor of the coaxial cable 10 and the outer conductor (the second flexible copper conductor 18) is the forward conductor of the coaxial cable 10. Regardless of the precise configuration, the forward and return conductors are ideally capable of carrying the corresponding current of the required current intensity. The conductor cross-section of the inner conductor, of the outer conductor and/or of the coaxial cable as a whole can be correspondingly chosen, designed or adjusted.

A voltage of up to 1000 V is present between the inner and outer conductors. This generates an electric field. If the insulation wall thickness, that is to say the thickness of the insulation 24 between the inner and outer conductors, is too small in the radial direction of the coaxial cable 10 or if said insulation 24 is too conductive, creepage currents are able to flow. These creepage currents can cause a short circuit, and damage the insulation 24 over time. These creepage currents must thus be prevented from ever occurring.

In order at least to reduce, if not completely avoid, interference from the electric field on other electronic components, the shielding 20 around the flexible copper conductors 14, 18 is provided. However, a power dissipation is also induced in the shield 20 by the electric field. This is dependent on the size of the distance between the outer conductor 18 and the shield 20.

A sensor, not shown in FIG. 1, can further be integrated into the coaxial cable 10. A heat-absorbing insulating material can be introduced into the non-conductive core 12. Foams are also conceivable therefor.

The coaxial cable 10 shown schematically in FIG. 1 can be used as a charging cable for the application of inductive charging. For this application, the coaxial cable 10 is configured to permit a transmission capacity of about 11 kW. The coaxial cable 10 is further configured in the case of this application to be able to transmit currents at a frequency of 85 kHz. The coaxial cable 10 is configured in the case of this application to permit the application of a voltage of 1000 V. This results in current intensities of from 30 to 50 A which are to be conducted by the coaxial cable 10.

Compared to the prior art, in which insulated individual wires (e.g. enameled wires) are combined to form a bundle, a litz wire or a cable, the coaxial construction of the coaxial cable 10 has advantages. On the one hand, the coaxial cable 10 permits homogeneous field line distribution. Homogeneous field line distribution results inter alia in a reduction in the power dissipation during power transmission, for example during power transmission in a connecting lead for inductive charging. This results inter alia in less heating of the coaxial cable 10 owing to the smaller power dissipation in the coaxial cable 10.

The coaxial cable 10 is a compact cable and therefore offers advantages in terms of overrun safety. Furthermore, a sensor, such as, for example, a sensor wire, for detecting the temperature can easily be introduced into the coaxial cable 10. When a non-conductive core 12 of or comprising a heat-absorbing material, such as a heat-absorbing plastics material or a heat-absorbing foam, is used, latent heat is additionally stored.

Apart from the application in inductive charging, the coaxial cable 10 can be used whenever high frequencies play a part in the transmission and the skin effect must be taken into account in the configuration of the cable design.

With the described coaxial cable 10, an improved cable for various high-frequency fields of application is provided, for example for the application of the inductive charging of electric vehicles.

The invention claimed is:

1. A coaxial cable, comprising:
a non-conductive core;
a first flexible copper conductor which surrounds the non-conductive core and serves as the inner conductor of the coaxial cable;
a first insulation around the first flexible copper conductor;
a second flexible copper conductor which surrounds the first insulation and serves as the outer conductor of the coaxial cable;
a shielding arranged around the second flexible copper conductor;
a second insulation between the non-conductive core and the first flexible copper conductor; and
a third insulation between the second flexible copper conductor and the shielding;
wherein the non-conductive core comprises plastics material or is formed of plastics material; and wherein the non-conductive core comprises or is formed of a heat-absorbing insulating material, wherein each of the first, second, and third insulations comprises a thermoplastic insulating plastics material or consists of a thermoplastic insulating plastics material.

2. The coaxial cable as claimed in claim 1, wherein the non-conductive core comprises air or is formed of air.

3. The coaxial cable as claimed in claim 1, wherein the first flexible copper conductor comprises a plurality of individual copper wires which are not insulated from one another or is formed of a plurality of individual copper wires which are not insulated from one another and/or wherein the second flexible copper conductor comprises a plurality of individual copper wires which are not insulated from one another or is formed of a plurality of individual copper wires which are not insulated from one another.

4. The coaxial cable as claimed in claim 1, wherein the first flexible copper conductor comprises one or more copper braids or is formed of one or more copper braids and/or wherein the second flexible copper conductor comprises one or more copper braids or is formed of one or more copper braids.

5. The coaxial cable as claimed in claim 1, further comprising at least one sensor, wherein at least the at least one sensor is in the form of a temperature sensor which is configured to detect the temperature of the coaxial cable.

6. The coaxial cable as claimed in claim 1, further comprising at least one second sensor which is configured to monitor a state of the cable and to communicate that state to a user via an evaluation unit.

7. The coaxial cable as claimed in claim 5, wherein the temperature sensor is in the form of a sensor wire introduced into the coaxial cable in the form of a sensor wire braided into the coaxial cable.

8. An electric vehicle charging device including the coaxial cable as claimed in claim 1.

* * * * *